(12) United States Patent
Jessup et al.

(10) Patent No.: US 6,544,000 B1
(45) Date of Patent: Apr. 8, 2003

(54) MAGNETOSTRICTIVE ADJUSTMENT OF PROPELLER BLADE

(75) Inventors: Stuart D. Jessup, Arlington, VA (US); Joseph P. Teter, Mt. Airy, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/912,691

(22) Filed: Jul. 26, 2001

(51) Int. Cl.[7] .................. B64C 11/16; B64C 11/44
(52) U.S. Cl. ................... 416/23; 310/26; 416/3; 416/155
(58) Field of Search ............... 416/23, 24, 3, 416/155; 310/26; 244/204, 205

(56) References Cited

U.S. PATENT DOCUMENTS

| | | | | |
|---|---|---|---|---|
| 3,885,758 A | * | 5/1975 | Croswell, Jr. ........... 244/134 D |
| 5,030,064 A | * | 7/1991 | Usami et al. ............... 415/200 |
| 5,389,845 A | * | 2/1995 | Brimhall ..................... 310/26 |
| 5,703,553 A | * | 12/1997 | Bushko et al. ............... 310/26 |
| 5,730,581 A | * | 3/1998 | Buter et al. ................. 416/23 |
| 5,828,143 A | * | 10/1998 | Kotlyar ....................... 310/26 |
| 5,973,440 A | * | 10/1999 | Nitzsche et al. ........... 310/326 |
| 6,109,870 A | * | 8/2000 | Yamakawa et al. ...... 244/17.25 |
| 6,139,268 A | * | 10/2000 | Murawski et al. .......... 415/914 |
| 6,273,681 B1 | * | 8/2001 | Yamakawa et al. ......... 310/328 |
| 6,322,324 B1 | * | 11/2001 | Kennedy et al. ......... 244/17.13 |
| 6,419,187 B1 | * | 7/2002 | Buter et al. ............... 244/35 R |

* cited by examiner

*Primary Examiner*—Burton S. Mullins
(74) *Attorney, Agent, or Firm*—Jacob Shuster

(57) ABSTRACT

A magnetostrictive rod subject to a magnetic field generated by an electrical activating coil within a pocket of a propeller blade is held in abutment with the body of the blade to effect its deflection causing change in shape involving a variation in blade camber in accordance with electrically powered adjustment control.

9 Claims, 2 Drawing Sheets

MAGNETOSTRICTIVE ADJUSTMENT OF PROPELLER BLADE

The present invention relates generally to adjustable change in propeller blade shape in order to obtain certain benefits such as reductions in unsteady blade rate forces.

BACKGROUND OF THE INVENTION

Attempts have heretofore been made under trailing edge blowing technology to adjust propeller blade loading. Such prior blade adjustment efforts have not been successful because of mechanical complications and reliability problems. It is therefore an important object of the present invention to provide for more effective adjustment of propeller blades involving for example changes in blade camber and pitch by use of magnetostriction.

SUMMARY OF THE INVENTION

In accordance with the present invention, propeller blade shape is adjusted by magnetostrictive actuators protectively enclosed within pockets formed within each of the propeller blades. Each of such actuators includes an electrical coil generating a magnetic field within the pocket in surrounding relation to a magnetostrictive rod having opposite ends through which its magnetostrictive deformation is transmitted to the body of the propeller blade under control of electric current to the coil.

DESCRIPTION OF THE DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
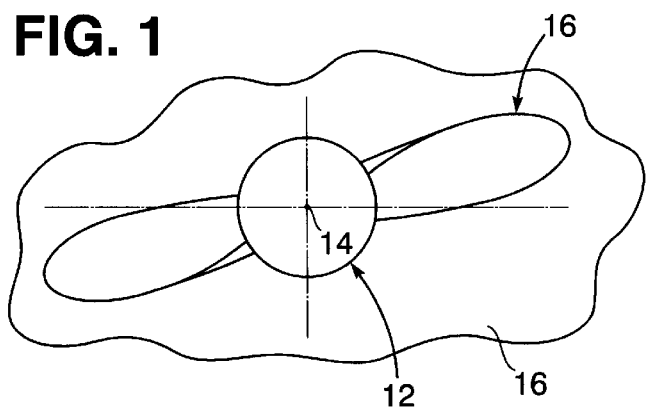
FIG. 1 is a partial front elevation view of a propeller hub projecting from the hull of a marine vessel, with propeller blades carried on the hub.
Figure 2:
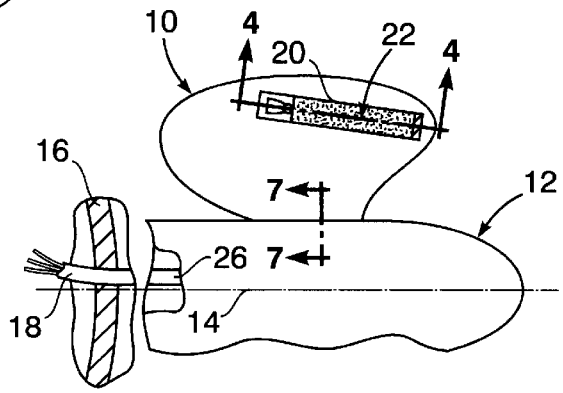
FIG. 2 is a partial side elevation view of the propeller hub and blade assembly shown in FIG. 1.
Figure 3:
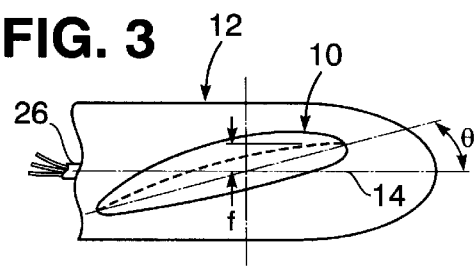
FIG. 3 is a top plan view of the propeller hub and one of the blades shown in FIG. 2.

Referring now to the drawing in detail, FIGS. 1, 2 and 3 illustrate at least two propeller blades 10 mounted on and radially projecting from a propeller hub 12 having a rotational axis 14 extending into the hull 16 of a marine vessel for example. Also extending through the hub 12 from each of the blades 10 into the hull 16, as hereinafter explained, is electrical wiring 18 as shown in FIG. 2.

With continued reference to FIGS. 2 and 3, each of the blades 10 has an elongated milled out pocket 20 formed in one side thereof. Within each of such pockets 20, a magnetic field is generated by a magnetostrictive actuator 22 to effect a controlled variation in shape reflected by a change in camber (f) of the blade 10 having a pitch angle θ, pursuant to the present invention as hereinafter explained.

Figure 4:
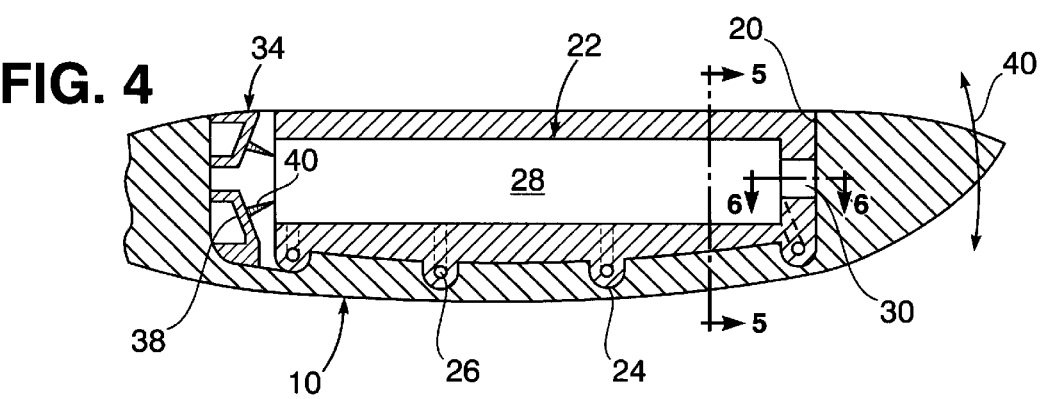
FIG. 4 is a partial section view taken substantially through a plane indicated by section line 4—4 in FIG. 2.
Figure 5:
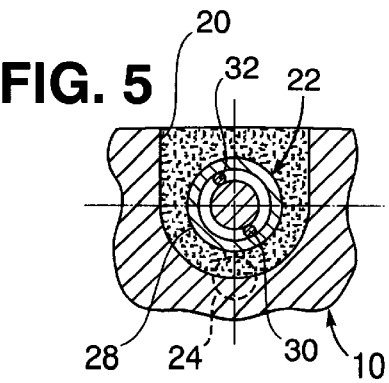
FIGS. 5 and 6 are partial section views taken substantially through planes indicated by section lines 5—5 and 6—6 in FIG. 4.
Figure 6:
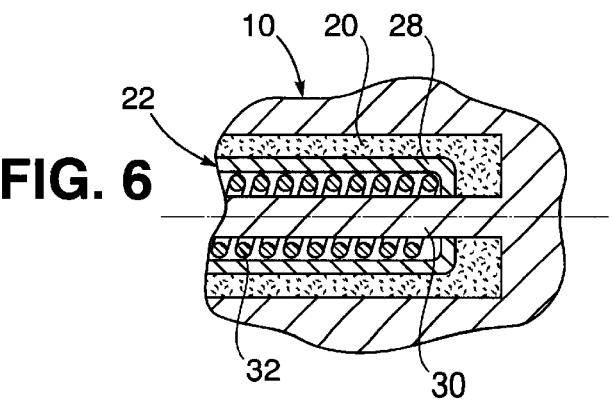
Figure 7:
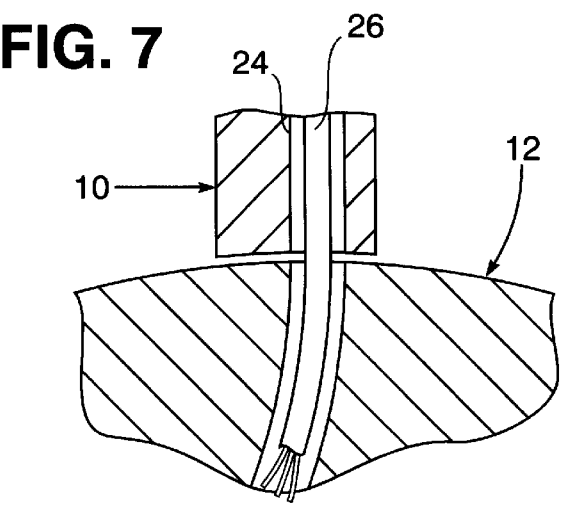
FIG. 7 is a partial section view taken substantially through a plane indicated by section line 7—7 in FIG. 2.

Referring now to FIGS. 2, 4, 5, 6 and 7, each of the pockets 20 in the blades 10 has a plurality of slots 24, such as four, formed at the bottom thereof through which wiring 26 from the magnetostrictive actuator 22 extends into the hub 12. As also shown in FIGS. 4, 5 and 6, each of the magnetostrictive actuators 22 includes an outer cylindrical shell 28 through which a magnetostrictive rod 30 coaxially extends. An electrical actuating coil 32 is spirally wound about the rod 30, which projects axially into the shell 28 from a solid body of the blade 10 within the adjacent axial end of its pocket 20 as shown in FIG. 6. The other axial end of the rod 30 and the actuator shell 28 are spaced from the body of the blade 10, at the other corresponding end of its pocket 20, by a stroke multiplier generally referred by reference numeral 34. The pocket 20 is otherwise occupied by a filler 36, such as an elastomer soft metal protectively surrounding the actuator 22.

With continued reference to FIG. 4, the stroke multiplier 34 associated with each of the actuators 22 according to one embodiment includes a pair of steel legs 38 positioned within the pocket 20 and attached to the body of the blade 10, with flexure elements 40 projecting therefrom into abutment with the end of the actuator 22. Thus, in response to energization of the actuator coil 32, the magnetostrictive rod 30 is axially lengthened by a small amount to exert a multiplied stroke flexure effect on the body of the blade 10 causing blade tip deflection as denoted by arrow 40 in FIG. 4 and a corresponding change in the blade camber (f) as hereinbefore referred to in FIG. 3.

Figure 8:
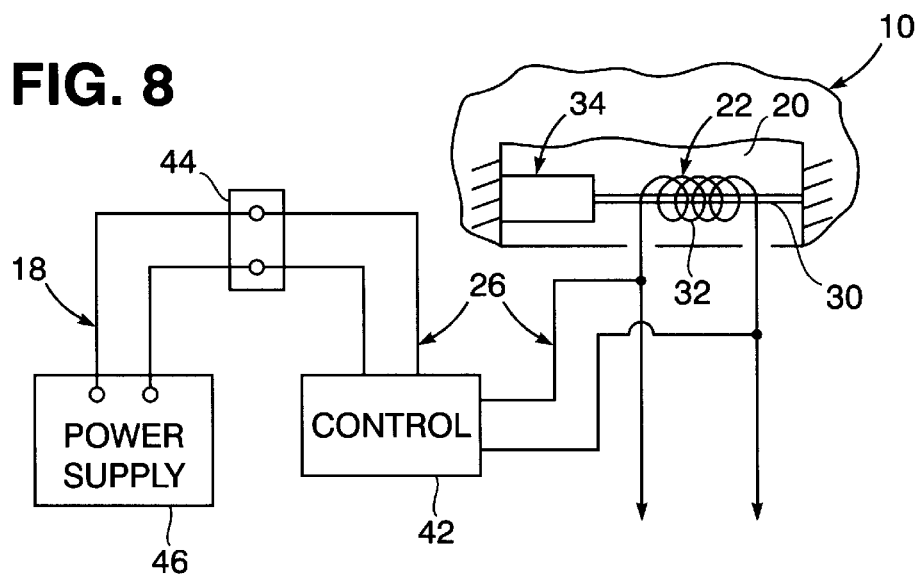
FIG. 8 is a diagram of the magnetostrictive blade adjustment system associated with the propeller blade assembly shown in FIGS. 1–7.

Referring now to FIG. 8, electrical energy for energization of the coils 32 of the magnetostrictive actuators 22 is supplied thereto through the aforementioned wiring 26 extending from control means 42, generally known in the art, which is disposed within the hub 12. Blade deflection is detected by sensors associated with such control 42 and varied by controlled regulation of electrical current supplied through the wiring 26 to correspondingly vary the strength of the magnetic fields within the pockets 20. Such wiring 26 extends externally from the propeller blade hub 12 to a slip ring connector 44, as diagrammed in FIG. 8. Such connector 44 transmits current between the wiring 26 and the wiring 18 extending from a suitable electrical power supply 46 within the marine vessel.

Thus, pursuant to the present invention, tip deflection of the blades 10 is effected by magnetostrictive elongation of the rods 30 within magnetic fields generated within the blade pockets 20 during operation therein of the actuators 22 to exert regulated flexure action. The change in shape of the propeller blades 10 thereby achieved may be utilized to reduce unsteady blade rate propeller forces associated with blade section lift. According to certain embodiments, operation of the magnetostrictive actuators 22 may be optimized for use at frequencies of the electrical energy supplied thereto corresponding to multiples of the rotational speed imparted to the propeller blade hub 12. Also the magnetostrictive adjustment of blade shape involved may be applied as lift control for aircraft propeller blades.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a propeller hub having a plurality of solid body blades projecting therefrom and electrical power transmitting wiring extending through the hub, blade adjustment means connected to said power transmitting wiring for changing blade shape with respect to each of the blades, comprising: an elongated open pocket formed within each of the blades; an actuator in each of the pockets having an elongated magnetostrictive rod; coil means within each of the pockets connected to said wiring for magnetostrictive deformation of the rod in response to electrical energy supplied through said wiring; and means engaged with said rod within each of the pockets for transfer of said deformation thereof into flexure of the blades causing deflection thereof.

2. The combination as defined in claim 1, wherein said coil means is inserted into the elongated pocket formed in each of the blades within which magnetic fields are generated by the coil means; and stroke multiplying means engaged with the rod within the pocket for effecting said flexure causing the deflection of the blade.

3. The combination of claim 2, wherein a plurality of slots are formed in the blade between the pocket and the hub within which the wiring extends from the hub to the coils means.

4. In combination with a propeller hub having a plurality of solid body blades projecting therefrom and electrical power transmitting wiring extending through the hub, blade adjustment means connected to said power transmitting wiring for changing blade shape with respect to each of the blades, including: an open elongated pocket formed in each of the blades; a magnetostrictive actuator in each of the pockets; and means within each of the pockets for transferring magnetostrictive deformation of the actuators into flexure of the blade causing deflection thereof.

5. The combination as defined in claim 4, wherein said means for transferring deformation comprises: coil means disposed within the elongated pocket and connected to the wiring for generating a magnetic field; and stroke multiplying means for holding the actuator in abutment with the blade within said pockets to effect said deflection of the blade.

6. The combination as defined in claim 5, wherein a plurality of slots are formed in each of the blades between the pockets and the hubs within which the wiring extends.

7. The combination as defined in claim 6, wherein the magnetostrictive actuator includes: a rod within each of the pockets.

8. The combination as defined in claim 4, wherein the means for changing blade shape includes: a rod within each of the pockets.

9. The combination as defined in claim 5, wherein each of the actuators are protectively enclosed within filler material in the pockets.

* * * * *